March 27, 1962 P. A. SIDELL 3,027,469
DIRECTIONAL DRIVE CONTROL FOR SELF-STARTING SYNCHRONOUS
MOTORS OF EITHER STARTING DIRECTION
Filed Sept. 28, 1959
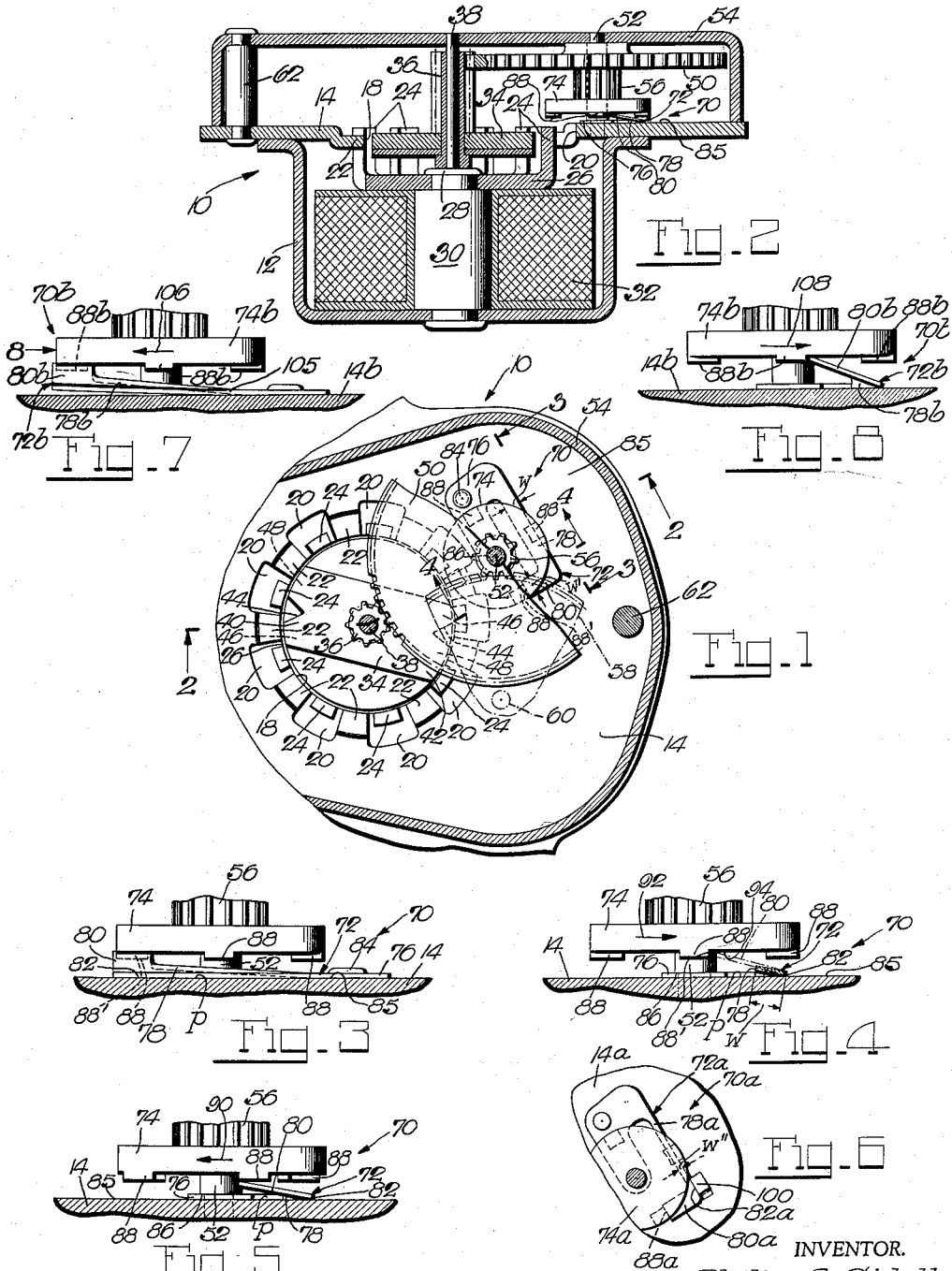
INVENTOR.
Philip A. Sidell
BY
Attorney.

United States Patent Office 3,027,469
Patented Mar. 27, 1962

3,027,469
DIRECTIONAL DRIVE CONTROL FOR SELF-STARTING SYNCHRONOUS MOTORS OF EITHER STARTING DIRECTION
Philip A. Sidell, West Hartford, Conn., assignor to The Ingraham Company, Bristol, Conn., a corporation of Connecticut
Filed Sept. 28, 1959, Ser. No. 842,627
8 Claims. (Cl. 310—41)

This invention relates generally to alternating current motors of synchronous type, and more particularly to directional drive controls for synchronous motors of random starting direction.

Directional drive controls of the type with which the present invention is concerned provide a spring element which in the manner of a spring pawl cooperates with a driven motor part in permitting rotation of this part in the correct drive direction of the motor, but obstructing its rotation in the opposite direction on a wrong-directional start of the motor and thereby compelling it and the rest of the motor drive to reverse into the correct drive direction. The spring element is customarily resiliently flexed against the associated motor part so as to snap into the path of a backing shoulder thereon whenever this motor part starts in the wrong direction, with the motor drive reversing into the correct drive direction on back-up of this shoulder against the spring element in the accustomed manner.

While prior directional drive controls of this type are satisfactory in most respects, they are deficient in a few important respects. Thus, the spring elements, customarily of leaf type, are usually made rather stiff for the sake of their reliable performance, resulting not only in their comparatively heavy rubbing contact with the associated motor parts and corresponding reduction of motor torque available for utility purposes, but also in rather noisy performance of these spring elements and, hence, of the motors themselves. Also, these spring elements are customarily arranged to act as cushioned stops which yield, more or less, on impact with the backing shoulders of their associated motor parts. Yet, while enhanced rebound of the associated motor parts into correct drive direction is generally attributed to this yielding-under-impact of the spring elements, I have found that this yielding behavior of the latter is at times conducive to hesitation in the reversal of their associated motor parts and is even responsible for occasional stalling of motors. This is due to the fact that reactive effects from this yielding-under-impact of the spring elements often extend to the initial drivers of the motors, i.e., their rotors, and occasionally cause damping, if not suppression, of the characteristic lively quiver of these rotors which is a prime stimulus for their reversal if blocked in their movement in the wrong direction.

It is an object of the present invention to provide a directional drive control of spring-type which is structurally as simple as, and has all the other advantages of, prior directional spring-type drive controls, without having either of their aforementioned deficiencies, however.

It is, therefore, among the objects of the present invention to provide for a synchronous motor of random starting direction a directional drive control spring which is sufficiently stiff to remain for its reliable performance in operative relation with an associated driven motor part for the longest time and even under conditions of shock and vibration, yet is sufficiently springy to have but very light rubbing contact with its associated motor part and to snap quite lively into the path of a backing shoulder on the latter on a wrong-directional start of the same.

It is another object of the present invention to provide a directional drive control spring of this type which, while quite springy for the aforementioned purposes, nevertheless acts as a rigid non-yielding stop for a backing shoulder on the associated motor part when the same starts in the wrong direction, thereby to obviate any possible damping of the lively quiver of the rotor of the motor on its suddenly interrupted travel in the wrong direction and, instead, compel instantaneous and full exertion of this rotor quiver toward rotor reversal and with it reversal of the entire motor drive.

It is a further object of the present invention to provide a directional drive control spring of this type which for its springy performance for the aforementioned purposes acts in true torsion, but is effectively locked or constrained against any torsional yield by a backing shoulder on the associated driven motor part on its impact with the spring, thereby to compel the latter to act as a rigid non-yielding stop for the backing shoulder on the associated motor part as aforementioned.

Another object of the present invention is to provide a directional drive control spring of the aforementioned torsion-type which may conveniently be blanked from flat sheet stock, and which has a longitudinal torsion arm and an inflexible lateral follower arm at the end of the torsion arm opposite its anchored end on a support member, with the torsion arm extending along the support member and having a relatively small permanent longitudinal twist which disposes the follower arm at an inclination to the support member and in follower relation with the associated driven motor part. In thus arranging the spring, the same may readily be made sufficiently stiff for its reliable and long-time performance even under conditions of shock and vibration, and still have the considerable springiness required for its light rubbing contact with the associated motor part and its lively snap into the path of a backing shoulder thereon when starting in the wrong direction, yet the torsion arm will, on impact of the backing shoulder on the associated motor part with the follower arm, be temporarily constrained against any yielding, torsional or otherwise.

A further object of the present invention is to provide a directional drive control spring of torsion-type of which the aforementioned twisted torsion arm rests with its entire length at all times on the support to which the spring is anchored, thereby compelling the spring to act only in true torsion in the performance of its designated function.

It is another object of the present invention to provide a directional drive control spring of torsion-type of which the aforementioned twisted torsion arm thereof is, alternatively, further permanently bent near its anchored end so as to extend with the greater part of its length at more or less slight inclination to the support to which the spring is anchored. With this alternative spring arrangement, the torsion arm will be longitudinally flexed, rather than torsionally stressed, for normally yieldingly holding its lateral arm in follower relation with the associated driven motor part, yet the torsion arm will be depressed against the support and constrained against any yielding, torsional or otherwise, on impact between its follower arm and the backing shoulder, with the spring thus acting as the aforementioned rigid non-yielding stop for the latter on a wrong-directional start of the associated motor part.

Other objects and advantages will appear to those skilled in the art from the following, considered in conjunction with the accompanying drawings.

In the accompanying drawings, in which certain modes of carrying out the present invention are shown for illustrative purposes:

FIG. 1 is a fragmentary section through a synchronous motor with a directional drive control embodying the present invention:

FIG. 2 is a section through the same motor taken substantially on the line 2—2 of FIG. 1;

FIGS. 3 and 4 are enlarged fragmentary sections through the same motor taken on the lines 3—3 and 4—4 respectively, of FIG. 1, and prominently showing the parts of the featured directional drive control.

FIG. 5 is a fragmentary section similar to FIG. 4, but showing the parts of the featured directional drive control in a different operating position;

FIG. 6 is a fragmentary view of a synchronous motor with a directional drive control which embodies the invention in a modified manner;

FIG. 7 is an enlarged fragmentary section through a synchronous motor with a directional drive control which embodies the present invention in a further modified manner, and FIG. 8 is a view, partly in section, of this further modified drive control as seen in the direction of the arrow 8 in FIG. 7.

Referring to the drawings, and more particularly to FIGS. 1 and 2 thereof, the reference numeral 10 designates a synchronous A.C. motor having a cup-shaped casing 12 and a plate 14 which is suitably secured to the casing. The casing 12 and plate 14 are of non-permanent magnetic material and form part of the field of the motor. The field plate 14 is provided with a circular aperture 18 and a plurality of cutouts 20 therearound to define one set of spaced field poles 22. The other set of field poles 24, which alternate with the field poles 22 (FIG. 1), are formed by upturned tongues on another field plate 26 which at 28 is secured to a central magnetic core 30 in the field casing 12. Located in the field casing 12 and surrounding the core 30 is a field coil 32 which on passage of an alternating current therethrough will set up periodically alternating, instantaneous opposite polarities in the field poles 22 and 24, as will be readily understood.

The instant motor further comprises a rotor 34 which in this instance is carried by a pinion 36 on a fixed shaft 38 extending from the core 30. The rotor 34 may be of permanent or non-permanent magnetic type, and may presently be assumed to be of permanent magnetic type with opposite poles 40 and 42 of opposite permanent polarities. Each of the rotor poles 40 and 42 is provided with an off-center notch 44 to divide it into pole sections 46 and 48 of different polar widths. In thus notching the poles of the rotor 34, the motor becomes self-starting, as is fully shown and described in the Kohlhagen Patent No. 2,677,776, dated May 4, 1954. Moreover, the rotor 34 will, on energization of the field coil 32, start in either direction, depending on the initial polarities of the field poles 22 and 24.

The motor pinion 36 is presently in mesh with a gear 50 on a shaft 52 which is mounted with one end in the field plate 14 and presently also with its other end in a gear housing 54. The pinion 36 and gear 50 constitute a first speed-reduction stage of the motor drive. Rotatable with the gear 50 is a pinion 56 that is in mesh with another gear 58 on a shaft 60 (FIG. 1) which may suitably be journalled with its ends in the field plate 14 and gear housing 54, and which may be considered to be the output shaft of the motor. The pinion 56 and gear 58 presently constitute a second speed-reduction stage of the motor drive. The gear housing 54 is suitably secured to the field plate 14, presently by pillars 62. The motor described so far may be considered to be conventional in every respect.

In accordance with the present invention, there is provided a directional drive control 70 which features a spring-type control element 72 and also includes a motor-driven member 74 with which the control element 72 cooperates in reversing the motor drive on a wrong-directional start thereof (FIGS. 1 to 5). The control element 72 presently comprises an anchor part or plate 76, a longitudinal torsion arm part 78 which extends from the anchor part 76, and a lateral follower arm part 80 at the free end of the torsion arm part 78. The control or spring element 72 is conveniently blanked from flat sheet material of adequate resiliency and of uniform thickness, with the longitudintal torsion arm 78 of this blank being given a permanent longitudinal twist of presently considerably less than a quarter turn (FIGS. 3 and 4), and in any event of less than half a turn. The torsion arm 78 may thus be permanently twisted in the initial blanking operation or in a subsequent operation, for instance by striking this arm in known manner with a coining pressure and at places to set up permanent opposite compressive and tensile stresses requisite for its permanent twist. In thus permanently twisting the torsion arm 78, the follower arm 80 is turned with the adjacent free end of the torsion arm 78 with which it remains coplanar thereat (FIGS. 4 and 5), with the side edge 82 of the torsion arm 78 remaining in this instance in the initial plane p of the blank and the remainder of the torsion arm twisting from this plane (FIG. 4) and the follower arm 80 becoming disposed at an inclination to this plane.

The spring element 72 is with its flat anchor part 76 mounted on a flat surface 85 of the field plate 14, presently by being riveted thereto at 84 and also by means of an overlying annular shoulder 86 on the fixed shaft 52 (FIGS. 1, 4 and 5). With the spring element 72 thus anchored to the field plate 14, the inclined follower arm 80 extends into follower relation with shoulder means 88 on the motor-driven part 74 which presently is a disc turning with the gear 50 and pinion 56. The shoulder means 88 are presently arranged in confronting relation with the support plate 14, and the follower arm 80, which is substantially inflexible as more fully explained later, is yieldingly urged, solely by resilient longitudinal torsional deflection of the torsion arm 78, into follower engagement with these shoulder means to be depressed from and snapped into the path of the latter on rotation of the motor-driven member 74 in the right and wrong drive directions, respectively.

In accordance with one aspect of the present invention, and as already mentioned, the torsion arm 78 of the present spring element 72 acts solely in torsion in yieldingly urging its arm 80 into follower engagement with the shoulder means 88 and permitting its resilient depression from and snap into the path of the latter on right and wrong directional drive of the member 74, respectively. To this end, the torsion arm 78 is of an inflexible width w (FIGS. 1 and 4), but its thickness and permanent longitudinal twist are such that the follower arm 80 and adjacent free end of the torsion arm 78 would, in the absence of the member 74, form a larger angle with the flat surface 85 of the field plate 14 than is shown in FIG. 4. Accordingly, the member 74 with its shoulder means 88 will, through intermediation of the inflexible follower arm 80, compel the torsion arm 78 into resilient torsional deflection (FIG. 4) with the torsion arm 78 being further torsionally loaded on each depression of the follower arm 80 by the overriding shoulder means 88 on the drive of the disc 74 in the right direction, presently clockwise as viewed in FIG. 1 and in the direction of the arrow 90 in FIG. 5. The follower arm 80 is inflexible, or substantially so, by being made shorter than the torsion arm 78 and by further being made of adequate width w' (FIG. 1). Of course, the force with which the follower arm 80 is yieldingly urged into follower engagement with the shoulder means 88 and, hence, also its operational sliding friction with the latter, may be varied to suit, and may be relatively small, on proper selection of the thickness and resiliency of the material of the spring element 72, of the lengths of the torsion and follower arms 78 and 80, and of the extent of the permanent twist in the torsion arm in comparison to the spacing of the member 74 from the support plate 14.

In accordance with another aspect of the present invention, the spring element 72 will act as a rigid non-yielding stop for the shoulder means 88 on being impacted thereby when the member 74 starts in the wrong direction, i.e., counter-clockwise as viewed in FIG. 1 and in the direction of the arrow 92 in FIG. 4. When such a wrong-directional start of the member 74, and hence of the motor, occurs, the follower arm 80 will snap into the path of the nearest shoulder 88' (there being presently four of them) with this nearest shoulder soon impacting with the follower arm 80 and instantaneously locking or constraining the latter against angular displacement about the longitudinal axis of the torsion arm 78. The follower arm 80 is thus constrained against angular displacement on impact with the nearest shoulder 88' by being presently wedged against the latter and the adjacent offset face 94 of the member 74 in the manner shown in dot-and-dash lines in FIG. 4. Of course, with the inflexible follower arm 80 thus constrained against angular displacement by the impacting shoulder 88', the torsion arm 78 is prevented from yielding in the only manner of which it is capable, namely torsionally, with the result that the spring element 72 acts indeed as a rigid non-yielding stop for the nearest shoulder 88' on impact therewith, and the ensuing abrupt stop of the latter forces the motor drive, including the rotor 34, into the same abrupt stop. The rotor 34, being thus stopped positively and abruptly on a wrong-directional start, will by its undampened lively action and under the further compellent influence of the periodically changing polarities of the field poles 22 and 24, assuredly swing without hesitation into the opposite direction and thus reverse the motor drive into the right direction.

It follows from the preceding that the arrangement of the spring element 72 is such as to preclude any operational resilient longitudinal flexure of any part thereof, and to permit only resilient longitudinal torsional deflection of the torsion arm 78. The components of any and all forces acting on the arm 80 by virtue of its follower engagement with the member 74, and having any tendencies longitudinally to flex the torsion arm 80, are rendered ineffective by making the torsion arm 78 of the described inflexible width $w$ and by having the torsion arm normally rest with its side edge 82 against the field plate 14. By making the torsion and follower arms 78 and 80 of considerable lengths, but safely within limits to preclude their longitudinal flexure when in action, the yielding force with which the arm 80 is urged into follower engagement with the member 74, and hence also its operational sliding friction therewith, may be kept relatively small despite the inflexible width of the torsion arm 78, with the result that no more than a negligible part of the motor torque is used up by the directional drive control and the latter performs with inappreciable, if any, noise.

The yielding force with which the follower arm of the spring element is urged into follower engagement with the associated motor-driven member may be even further reduced. Thus, FIG. 6 shows a modified directional drive control 70a of which the torsion arm 78a of the spring element 72a on the field plate 14a is of such narrow width $w''$ as conceivably longitudinally to flex widthwise on impact of a shoulder 88a on the associated motor-driven member 74a with the follower arm 80a on a wrong-directional start of the former. However, this torsion arm 78a of exceptionally small width is at its free end effectively backed with its side edge 82a against a fixed stop 100 which may conveniently be struck from the field plate 14a, so that any force on the follower arm 80a tending longitudinally to flex the torsion arm 78a widthwise is entirely taken up by this stop 100 before it may exert itself on the torsion arm. Of course, with this modified directional drive control 70a, involving a torsion arm of exceedingly narrow width and a fixed backing stop at its free end, the yielding force with which the follower arm 80a is urged into engagement with the associated motor-driven member 74a, and also the operational sliding friction between them, may be at a minimum.

While in the described directional drive controls 70 and 70a the torsion arm of the spring element normally rests with one side edge against the field plate and, hence, is operationally longitudinally resiliently inflexible thereagainst, FIGS. 7 and 8 show a further modified directional drive control 70b of which the torsion arm 78b of the spring element 72b is longitudinally resiliently flexible against the field plate 14b. In fact, and as shown in FIG. 7, the torsion arm 78b may be longitudinally resiliently flexed away from the support plate 14b sufficiently to act solely in longitudinal resilient flexure in yieldingly retaining its inflexible arm 80b in follower relation with the motor-driven member 74b. The spring element 72b may thus be exactly like the spring element 72 (FIG. 3), except that the present spring element 72b may be permanently bent at 105 for permanent deflection of the torsion arm 78b away from the field plate 14b. Thus, with the member 74b driven in the correct direction as represented by the arrow 106 in FIG. 7, the torsion arm 78b will longitudinally flex toward and away from the field plate 14b when the shoulder means 88b override the follower arm 80b. However, on a wrong-directional start of the member 74b in the direction of the arrow 108 in FIG. 8, the follower arm 80b will snap into the path of the nearest shoulder means 88b and be impacted thereby. As a result of this impact as shown in FIG. 8, the permanently twisted torsion arm 78b will be longitudinally flexed against the field plate 14b and its follower arm 80b will then be locked against angular displacement to leave the spring element 72b without any yield, torsional or flexurewise. The spring element 72b will thus act as a positive stop for the shoulder means 88b on a wrong-directional start of the member 74b, but will act in longitudinal flexure for the rest of its performance.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. A directional drive control for a self-starting synchronous motor of reaction-type, comprising a driven member starting in either direction; a fixed support member, said members having surfaces facing each other; a shoulder on and projecting from said surface of one of said members; a substantially straight longitudinally twisted leaf spring of greater width than thickness having one end lying flat on said surface of the other member and anchored thereto, with the rest of said leaf spring having freedom for at least torsional resilient deflection and the other end thereof being in the path of said shoulder, the twist of said leaf spring being sufficient to have said other end thereof widthwise inclined to said surfaces and be with its side edge thereat nearest said surface of said one member in operative alignment with said shoulder so as to be resiliently depressed from and snapped into the path of the latter on rotation of said driven member in the right and wrong directions, respectively, and said surfaces being spaced so that said other spring end will be wedged between them by said shoulder on impact therewith.

2. A directional drive control for a self-starting synchronous motor having a rotor with a power start in either direction, comprising a fixed support; a rotary member driven by the rotor and having a face confronting said support and a shoulder projecting from said face; and a substantially straight longitudinally twisted leaf spring of greater width than thickness having one end lying flat on said support and anchored thereto, with the rest of said leaf spring having freedom for at least torsional resilient deflection and the other end thereof being in the path of said shoulder, the twist of said leaf spring being sufficient to have said other end thereof widthwise inclined to said face and be with its side edge thereat nearest said face in operative alignment with said shoulder so as to be resiliently depressed from and snapped into the path of the latter on rotation of said member in the right and wrong directions, respectively, said leaf spring being widthwise inflexible and said face and support being spaced so that said other spring end will be wedged between them by said shoulder on impact therewith.

3. A directional drive control as set forth in claim 2, in which said leaf spring normally rests with its other side edge on said support so that said leaf spring has freedom for only torsional resilient deflection.

4. A directional drive control as set forth in claim 2, in which said leaf spring is normally flexed away from said support so as to have also freedom for resilient longitudinal flexure against the latter.

5. A directional drive control as set forth in claim 2, in which said leaf spring is normally flexed away from said support sufficiently to respond only in resilient longitudinal flexure to depression of said other end thereof by said shoulder.

6. A directional drive control as set forth in claim 2, in which said side edge of said other spring end is formed by an inflexible lateral arm on said leaf spring.

7. A directional drive control as set forth in claim 6, in which said side edge of said other spring end is provided by an inflexible lateral arm on said leaf spring formed integrally with the latter and being coplanar with said other end thereof.

8. A directional drive control as set forth in claim 6, in which said side edge of said other spring end is formed by an inflexible lateral arm on said leaf spring, and the latter is of such small width as to be widthwise resiliently flexible for minimum resistance to its torsional resilient deflection, and there is provided on said support a stop backing the other side edge of said other spring end to prevent widthwise flexure of said leaf spring on impact with said shoulder.

References Cited in the file of this patent
UNITED STATES PATENTS
2,766,863    Berg _____ Oct. 16, 1956